United States Patent [19]

Drain et al.

[11] Patent Number: 4,565,837
[45] Date of Patent: Jan. 21, 1986

[54] RAPID CURING EPOXIDE COMPOSITION EMPLOYING STABLE CARBENIUM SALT CATALYST

[75] Inventors: Kieran F. Drain, Parma Heights; David J. Dunn, Twinsburg, both of Ohio

[73] Assignee: Loctite Corporation, Newington, Conn.

[21] Appl. No.: 669,189

[22] Filed: Nov. 7, 1984

[51] Int. Cl.$^4$ .................. C08G 59/18; C08G 59/68
[52] U.S. Cl. .................. 523/400; 523/454; 523/457; 524/906; 528/88; 528/89; 528/91; 528/92; 528/361; 528/408; 528/409; 528/507
[58] Field of Search ............ 528/91, 408, 92, 88, 528/89, 409, 507, 361; 524/906; 523/400, 457, 454

[56] References Cited

U.S. PATENT DOCUMENTS 4,358,578  11/1982  Brownscombe ............ 528/91

FOREIGN PATENT DOCUMENTS 56-36540  4/1981  Japan ............ 524/906

OTHER PUBLICATIONS

Journal of Polymer Science: Polymer Chemistry Edition, vol. 11, pp. 1825–1839; John Wiley & Sons, Inc., 1973; and vol. 14, pp. 2853–2866, 1976.

Primary Examiner—Ronald W. Griffin
Attorney, Agent, or Firm—Walter J. Steinkraus; Eugene F. Miller

[57] ABSTRACT

Compounds with a plurality of oxirane functional groups can be cured to a fixture in less than one minute with a catalyst composition of a trityl or tropylium salt of a non-nucleophillic anion and a suitable solvent. Typical catalyst salts include trityl tetrafluoroborate, trityl hexachloroantimonate and tropylium hexafluorophosphate. The catalyst composition may conveniently be extended with liquid polymeric vehicles and acidic fillers.

15 Claims, No Drawings

RAPID CURING EPOXIDE COMPOSITION EMPLOYING STABLE CARBENIUM SALT CATALYST

TECHNICAL FIELD

This invention relates to adhesive compositions which fixture in approximately one minute or less and reach their full properties in a short time thereafter in the manner of cyanoacrylates. It relates more particularly to epoxy formulations where rapid curing is achieved by introducing stable carbenium ion initiators into the epoxy.

BACKGROUND ART

A major disadvantage of prior art fast room temperature curing epoxies, i.e., mercaptan cured, is that the rapid gelation retards the development of full properties through the restriction of molecular motion and the cure mechanism involved. Extremely fast cures result in overly plasticized product due to the need to use a high level of curative. In addition, for epoxies cured by conventional amine or mercaptan curing agents, there is a critical mix ratio or stoichiometry for the resin/hardener mixture with thorough mixing necessary to achieve full cure.

In U.S. Pat. No. 4,092,296 a catalyst system for room temperature curing of epoxy resins is described which comprises a metallic fluroborate salt such as the tin, copper, zinc, nickel, lead or silver salt.

In U.S Pat. No. 4,396,754 there are described compositions of epoxy compounds and catalysts selected from lithium or group II metal salts of non-nucleophilic acids such as $LiBF_4$, $Ca(BF4)_2$, $Mg(BF4)_2$, $LiPF_6$, $LiSbF_6$, $LiAsF_6$, etc. Some of these compositions are reported to give very rapid cure at room temperature.

High temperature rapid curing epoxy resin systems are available utilizing high temperature or radiation curing. In these cases cationic ring opening polymerization of the epoxy rather than addition polymerization is achieved.

Suitable photoinitiators are diaryliodonium, diarylsulfonium, dialkylphenarylsulfonium, dialkylphenarylsulfonium, dialkyl4-hydroxyphenylsulfonium, triarylselenonium salts and related materials described in such patents as U.S. Pat. Nos. 4,069,054; 4,069,055; 4,138,255; 4,175,972; 4,175,973; 4,367,261; 4,374,066; 4,398,014; 4,399,071; 4,417,061, etc.

High temperature catalysts commonly employed are Lewis acid amine complexes such as Boron trifluoride monoethylamine which dissociate at elevated temperatures releasing the Lewis acid catalyst $BF_3$. $BF_3$ amine complex initiation of epoxies is reported to be described in U.S. Pat. No. 2,717,285.

While $BF_3$ amine complexes are available which dissociate at room temperature, e.g., $BF_3$ N-diphenylamine, room temperature curing using stable carbenium ions has not been commercialized.

Kinetic studies of trityl salt initiated polymerization of 1,2-butylene oxide in solution are reported in *J. Polymer Sci: Polymer Chem Ed*, 11, 1825–1839 (1973) and 14, 2853–2866 (1976). The polymers produced were low molecular weight oligomers which would not be useful as cured adhesives. Storage stable dispersions of trityl salts as initiators for curing epoxy resins to high molecular weight solids are not suggested.

Mechanistic studies of trityl and tropylium salt initiated polymerization of alkyl vinyl ethers, tetrahydrofuran and N-vinylcarbazole are reported by A. Ledwith in *ACS Advanced Chem. Ser.*, 91 317–334 (1969).

SUMMARY OF THE INVENTION

It is an aspect of the present invention to produce epoxy compositions which cure rapidly and reach full properties in a short time after gelation.

It is a further aspect of the present invention to produce an epoxy resin system cured by stable carbenium ion catalysts.

It is still a further aspect of the present invention to produce catalyst dispersions which can cure epoxy resins to high molecular weight rapidly and at room temperature.

It is a yet further aspect of the present invention to produce catalyst dispersions which can be mixed with epoxy resins in a convenient mix ratio, where the said catalysts are extended in an inert filler vehicle mixture.

In accordance with the invention there is provided a two part adhesive composition of the type which exhibits rapid room temperature curing, which composition comprises:

PART 1

At least one oxirane functional resin selected from di- and polyepoxide compounds.

Part one may additionally comprise polymeric additive(s) or filler(s).

PART 2

(a) A stable carbenium ion salt, i.e., a triphenylmethyl or tropylium salt as hereinafter defined.

(b) A solvent for the said salt.

(c) Optionally a liquid vehicle in which the salt solution may be stored or extended.

(d) Optionally fillers and additive(s).

DETAILED DESCRIPTION OF THE INVENTION

The diepoxide and polyepoxide compounds of Part I include any material containing a plurality of oxirane functional groups. Preferred resins are those which result from bisphenol-A (4,4'-isopropylidene diphenol) and epichlorohydrin, i.e., bisphenol-A diglycidyl ether (DGEBA), and extended prepolymers thereof. Other particularly suitable resins include cycloaliphatic epoxies, and epoxidized novolacs.

Stable carbenium ion salts or carbocation salts include certain triphenyl methyl ($Ph_3C$) or tropylium salts. These salts are defined by the formulas $Ph_3C^+X^-$ or $C_7H_7^+X^-$, wherein $X^-$ is a weak nucleophile such as $SbCl_6^-$, $SbCl_3^-$, $SbF_6^-$, $AsF_6^-$, $SnCl_5^-$, $PF_6^-$, $BF_4^-$, $CF_3SO_3^-$, $ClO_4^-$.

Such catalysts are effective at levels of about 0.1–10% by weight (%W) and are especially preferred at levels of 2–5%W of the total formulation. The catalysts are suitably present in the part 2 composition at levels of 2–25%W.

Suitable solvents for the carbenium ion salts include some ketones, ethers and esters. Particularly effective solvents are 3,5,5-trimethyl-2-cyclohexen-1-one(isophorone), 2,6-dimethyl-4-heptanone(isovalerone), diethyleneglycol monoethyl ether, tetrahydrofurfuryl alcohol, 2-ethoxyethylacetate (Cellsolve$^R$ Acetate), and 2-(2-ethoxyethoxy)ethyl acetate (Carbitol$^R$ Acetate). Preferably the solvent is nonvolatile, non-nucleophillic and moisture free. Solvents commonly comprise about 15%W of the part 2 formulation.

Likewise liquid vehicles for extending the salt solutions must be non-nucleophillic and moisture free. Suitable vehicles include polyepichlorohydrin, polybutenes, hydroxy and terminated polybutadienes, carboxy terminated polybutadienes, polyglycols and polyglycol esters. Such vehicles commonly comprise 40%W of the catalyst dispersions.

Since alkaline materials retard or inhibit cationic curing, fillers and pigments should be acidic. the acidity of fillers is determined by ASTM test D 1208-7.8. Since the trityl and tropylium salts are moisture sensitive fillers are also chosen on the basis of moisture content which is preferably less than 0.5% and still more preferably less than 0.1%.

Examples of acceptable fillers are Anhydrous aluminum silicates, Anhydrous calcium silicates, Barytes, Amorphous silica (Imsil 54), Kaolin and powdered aluminum. Fillers commonly comprise 40%W of the catalyst dispersions.

The invention will be better understood by reference to the following examples.

EXAMPLE 1

A two-part epoxy formulation described below was prepared. Mixing both parts 1:1 generates cure in 30 seconds and gives the following properties after 16 hours of room temperature aging. It should be noted a large exotherm accompanies cure. Gelation and vitrification are effectively simultaneous and follow an induction period.

Tensile Shear Strength Solvent Wiped Mild Steel
ASTM-D-1002-64: 1360 psi
Shore D Hardness: 65 D Hence the catalyst may be extended to give a convenient mix ratio, two-part epoxy formulation which exhibits rapid curing and high strengths.

FORMULATION

|  | % WT. |
|---|---|
| Part A |  |
| Trityl tetrafluoroborate | 5.0 |
| Isophorone | 15.0 |
| Polyepichlorohydrin | 36.65 |
| Calcined aluminum silicate A | 1.77 |
| Barytes | 11.98 |
| Calcined anhydrous aluminum silicate B | 29.60 |
|  | 100.00% |
| Part B |  |
| Epoxy Resin DGEBA (Staufers E-8202-T-29) | 100.0% |

Table 1 illustrates the difference in the rate of strength development for cationically and Loctite E-POX-E$^R$ QM-50, a typical bisphenol-A resin based two-part mercaptan cured fast epoxy system. The resin cured by carbocation catalysis reaches effectively full strength after 30 minutes and has greater than 50% ultimate strength after ten (10) minutes. The mercaptan cured epoxy gels in five (5) minutes but requires up to two hours for 50% strength development.

TABLE 1
TENSILE SHEAR STRENGTH VS. TIME SINCE BOND ASSEMBLY

| TIME SINCE BOND ASSEMBLY | CATIONICALLY CURED FORMULATION - EXAMPLE 1 | MERCAPTAN CURED E-POX-E$^R$ QM-50 |
|---|---|---|
| 10 Minutes | 760 | 0 |
| 30 Minutes | 1,293 | 173 |
| 120 Minutes | 1,080 | 1,180 |
| 16 Hours | 1,360 | 2,050 |

EXAMPLE 2

A two-part epoxy formulation described below was prepared. A 30 second cure time was recorded on mixing two grams of each component. The following properties were obtained after 16 hours of room temperature aging.

Tensile Shear Strength Solvent Wiped Mild Steel
ASTM-D-1002-64: 1480 psi
Shore D Hardness: 65 D

FORMULATION

|  | % WT. |
|---|---|
| Part A |  |
| Trityl tetrafluoroborate | 5.0 |
| Isophorone | 15.0 |
| Polyepichlorohydrin | 36.65 |
| Calcined aluminum silicate A | 1.77 |
| Barytes | 11.98 |
| Calcined anhydrous aluminum silicate B | 29.60 |
|  | 100.00% |
| Part B |  |
| DGEBA | 56.00 |
| Barytes | 20.00 |
| Calcined aluminum silicate | 22.00 |
| Hydrophobic silica | 2.00 |
|  | 100.00% |

EXAMPLE 3

A two-part epoxy formulation described below was prepared. The formulation was cured in a no-mix fashion, i.e., with Part A applied to one substrate and Part B to a second with a bond being formed when the two substrates were brought together. The substrates were solvent wiped mild steel lapshears and a 30 second fixture time was recorded.

Tensile shear strength of 310 psi were recorded after 16 hours room temperature aging.

FORMULATION

| Part A |  |
|---|---|
| Trityl tetrafluoroborate | 25% |
| Tetrahydrofurfuryl alcohol | 75% |
| Part B |  |
| Alicyclic Diepoxy Carboxylate (Cycloaliphatic epoxy Ciba Geigy CY179) | 100% |

Hence it can be seen that with these catalysts stoichiometry is non-critical. Thorough mixing is required in examples one and two to ensure homogeneity with respect to the fillers.

Examples 1 to 3 illustrate preferred embodiments of the development. The remaining examples describe some of the catalyst, solvent, carrier, resin, and filler variations utilized within the scope of the invention.

EXAMPLE 4

Example 4 illustrates the use of these catalysts with epoxidized novalak resins. Additionally Example 4 describes the use of a new solvent. A two-part epoxy formulation described below was prepared. On mixing the two parts in equal weights (2 gms of each) a 50 second cure time was recorded. The following properties were obtained after 16 hours room temperature aging.

Tensile Shear Strength Solvent Wiped Mild Steel ASTM-D-1002-64: 1000 psi
Shore D Hardness: 70 D

|  | % WT. |
|---|---|
| Part A | |
| Trityl tetrafluoroborate | 5.00 |
| Carbitol ® acetate | 15.00 |
| Polyepichlorohydrin | 36.65 |
| Calcined aluminum silicate A | 1.77 |
| Barytes | 11.98 |
| Calcined anhydrous aluminum silicate B | 29.60 |
|  | 100.00% |
| Part B | |
| Liquid Epoxy Novolac Resin (CIBA 1139) | 100.00% |

EXAMPLE 5

Example 5 illustrates the use of non-mineral fillers, i.e., powdered metal filler, synthetic polymer thickener. A two-part epoxy formulation described below was prepared. Cure time on mixing equal parts by weight was 35 seconds. The following properties were obtained after 16 hours of room temperature aging.

Tensile Shear Strength Solvent Wiped Mild Steel ASTM-D-1002-64: 1487 psi
Shore D Hardness: 65 D

FORMULATION

|  | % WT. |
|---|---|
| Part A | |
| Trityl tetrafluoroborate | 5.0 |
| Isophorone | 15.0 |
| Polyepichlorohydrin | 39.3 |
| Powdered Aluminum | 39.3 |
| Polyvinylidene chloride micro spheres | 0.4 |
|  | 100.0% |
| Part B | |
| Epoxy Resin DGBA (Staufers E-8202-T-29) | 100.0% |

Example 6 illustrates the use of other fillers. The formulations and results are described below.

FORMULATIONS

|  | I | II | III | IV |
|---|---|---|---|---|
| Part A | | | | |
| Trityl tetrafluoroborate | 5 | 5 | 5 | 5 |
| Isophorone | 15 | 15 | 15 | 15 |
| Polyepichlorohydrin | 40 | 40 | 40 | 40 |
| Anhydrous calcium sulphate | 40 | — | — | — |
| Amorphous silica | — | 40 | — | — |
| Kaolin Clay | — | — | 40 | — |
| Non-calcined aluminum silicate | — | — | — | 40 |
| Part B | | | | |
| Epoxy Resin DGBPA (Staufers E-8202-T-29) | 100.00% | | | |
| *Results (2 gms A + 2 gms B)* | | | | |
| Cure time seconds | 35 | 30 | 45 | 35 |
| Shore D Hardness | 60 | 55 | 50 | 55 |

EXAMPLE 7

Example 7 illustrates the use of other carbocation catalysts.

FORMULATION

|  | I | II |
|---|---|---|
| Part A | | |
| Trityl hexachloroantimonate | 25 | — |
| Tropylium hexafluorophosphate | — | 25 |
| Isophorone | 75 | 75 |
| Part B | | |
| Epoxy Rein DGBPA (Staufers E-8202-T-29) | 100.00% | |
| *Results 0.4 gms A + 2 gms B* | | |
| Cure time seconds | 30 | 60 |
| Shore D Hardness | 65 | 65 |

EXAMPLE 8

Example 8 illustrates the use of alternative liquid vehicles as described previously Part 2 (III).

FORMULATION

|  | I | II | III | IV | V |
|---|---|---|---|---|---|
| Part A | | | | | |
| Trityl tetrafluoroborate | 5 | 5 | 5 | 5 | 5 |
| Isophorone | 15 | 15 | 15 | 15 | 15 |
| Polyepichlorohydrin | 80 | — | — | — | — |
| Polyethyleneglycol-monooleate | — | 80 | — | — | — |
| Carboxyterminated polybutadiene | — | — | 80 | — | — |
| Hydroxyterminated polybutadiene | — | — | — | 80 | — |
| Polybutene | — | — | — | — | 80 |
| Part B | | | | | |
| Epoxy Resin DGBPA (Staufers E-8202-T-29) | 100.00% | | | | |
| *Results 2 gms A + 2 gms B* | | | | | |
| Cure time seconds | 25 | 120 | 15 | 25 | 20 |

We claim:

1. A two part composition curable to a solid upon mixing at room temperature comprising:
   (I) a first part comprising a di- or polyepoxide compound, and
   (II) a second part comprising a trityl or tropylium salt of weak nucleophile anion in a solvent.

2. A composition as in claim 1 wherein said weak nucleophile anion is selected from $SbCl_6^-$, $SbCl_3^-$, $SbF_6^-$, $AsF_6^-$, $SnCl_5^-$, $PF_6^-$, $BF_4^-$, $CF_3SO_3^-$ and $ClO_4^-$.

3. A composition as in claim 1 wherein said solvent is nonvolatile, non-nucleophillic and moisture free.

4. A composition as in claim 3 wherein said solvent is selected from isophenone, isovalerone, diethyleneglycol, monoethyl ether, tetrahydrofurfuryl alcohol, 2-ethoxyethyl acetate and 2-(2-ethoxyethoxy)ethyl acetate.

5. A composition as in claim 1 wherein said salt is present at a level of 2–25% of said second part.

6. A composition as in claim 1 wherein said second part further comprises extender vehicle selected from nonnucleophillic moisture free liquid polymers.

7. A composition as in claim 6 wherein said extender vehicle is selected from polyepichlorohydrin, polybutenes, hydroxy terminated polybutadienes, carboxy terminated polybutadienes, polyglycols and polyglycol esters.

8. A composition as in claim 6 further comprising an acidic filler having less than 0.5% moisture content.

9. A composition as in claim 8 wherein said filler is selected from anhydrous aluminium silicates, anhydrous calcium silicates, Barytes, amorphous silica, Kaolin, powdered aluminium and mixtures thereof.

10. A composition as in claim 8 wherein said first part comprises a di- or polyepoxide resin selected from the diglycidyl ether of bisphenol-A and prepolymers derived therefrom, and the second part comprises about 5% of said salt, about 5% of said solvent, about 40% of said extender vehicle and about 40% of said filler.

11. A composition as in claim 1 wherein said di- or polyepoxide compound is selected from bisphenol-A diglycidyl ether, extended prepolymers thereof, cycloaliphatic epoxies and epoxidized novalacs.

12. A method of producing a cured solid polymer comprising mixing a di- or polyepoxide resin with a composition of a trityl or tropylium salt of a non-nucleophillic anion and a non-nucleophillic moisture free nonvolatile solvent at room temperature.

13. A method as in claim 12 wherein said trityl or tropylium salt composition further comprises liquid polymeric vehicle.

14. A method as in claim 13 wherein said trityl or tropylium salt composition further comprises an acidic filler.

15. A method as in claim 14 wherein said di- or polyepoxide resin and said trityl or tropylium salt composition are mixed in a 1:1 weight ratio.

* * * * *